(12) United States Patent
Quintana Sanchez et al.

(10) Patent No.: US 11,522,610 B2
(45) Date of Patent: Dec. 6, 2022

(54) FREE SPACE OPTICAL RECEIVER

(71) Applicant: AIRBUS SAS, Blagnac (FR)

(72) Inventors: Crisanto Quintana Sanchez, Bristol (GB); Gavin Erry, Bristol (GB); Yoann Thueux, Bristol (GB)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 17/459,982

(22) Filed: Aug. 27, 2021

(65) Prior Publication Data

US 2022/0131607 A1 Apr. 28, 2022

(30) Foreign Application Priority Data

Oct. 28, 2020 (GB) ..................................... 2017121

(51) Int. Cl.
*H04B 10/118* (2013.01)
*H04B 10/60* (2013.01)

(52) U.S. Cl.
CPC ........... *H04B 10/118* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 2005/0025492 A1* | 2/2005 | Marazzi | ............... | H04B 10/112 398/131 |
| 2008/0102657 A1* | 5/2008 | Lang | ...................... | H01R 12/52 439/78 |
| 2010/0299900 A1 | 12/2010 | Darby | | |
| 2017/0207850 A1 | 7/2017 | Takahashi et al. | | |
| 2017/0264365 A1* | 9/2017 | Takahashi | ............ | H04B 10/548 |
| 2017/0299812 A1* | 10/2017 | Zhao | ...................... | G02B 6/124 |
| 2019/0379454 A1* | 12/2019 | Mitchell | .............. | G02B 6/4249 |

FOREIGN PATENT DOCUMENTS

| | | |
|---|---|---|
| CN | 103095373 | 5/2013 |
| CN | 104202094 | 12/2014 |
| EP | 3 208 960 | 8/2017 |
| WO | 2016/088318 | 6/2016 |
| WO | 2017/141854 | 8/2017 |
| WO | WO-2017141854 A1 * | 8/2017 |
| WO | 2018/104725 | 6/2018 |

OTHER PUBLICATIONS

Combined Search and Examination Report for GB Application No. 2017121.1 dated Aug. 5, 2021, 10 pages.

* cited by examiner

*Primary Examiner* — Darren E Wolf
(74) *Attorney, Agent, or Firm* — Nixon & Vanderhye P.C.

(57) ABSTRACT

A free space optical receiver including a multi-mode transmission medium configured to receive a light beam comprising a plurality of modes, the light beam having been propagated through a free space path. The free space optical receiver also includes a mode separating means configured to separate the plurality of modes for transmission through a corresponding first plurality of transmission media as a corresponding plurality of single-mode light beams, and a combining means configured to combine two or more of the plurality of single-mode beams into a combined beam for transmission through a further transmission medium.

19 Claims, 3 Drawing Sheets

FREE SPACE OPTICAL RECEIVER

RELATED APPLICATION

This application claims priority to and incorporates by reference United Kingdom Patent Application GB 2017121.1, filed Oct. 28, 2020.

TECHNICAL FIELD

The present invention relates to free space optical receivers and to vehicles, such as aircraft, comprising the same.

BACKGROUND

Free space optical (FSO) communications is an optical communications technique that uses light propagating in free space to wirelessly transmit data. In the context of FSO communications, 'free space' refers to, for example, air, space, vacuum, or similar and is in contrast with communications via solids such as a fiber-optic cable. FSO communications can be useful for example in cases where communication via physical connections, such as fiber-optic cables or other data cables, is impractical. One such case is, for example, communications between an aircraft such as a drone and a ground-based terminal.

Free space optical communication systems present improved data rates and security compared to radiofrequency systems. In such systems, the use at the receiver of small area photodetectors such as fiber photodetectors is advantageous for obtaining a high bandwidth and, as a result, high data rates. Since the photodetector sensitivity decreases as the bandwidth increases, optical preamplifiers may be used compensate for the decrease in sensitivity of the photodetector and avoid or mitigate a need for increased transmitter power.

Such optical preamplifiers typically require a single-mode input. However, in a free space system, light is distorted by atmospheric turbulence during free space propagation. Therefore, in such systems, coupling light into a single-mode fiber is challenging and engenders deterioration of the coupling efficiency.

SUMMARY

According to a first aspect of the present invention, there is provided a free space optical receiver comprising: a multi-mode transmission medium configured to receive a light beam comprising a plurality of modes, the light beam having been propagated through a free space path; a mode separating means configured to separate the plurality of modes for transmission through a corresponding first plurality of transmission media as a corresponding plurality of single-mode light beams; and a combining means configured to combine two or more of the plurality of single-mode beams into a combined beam for transmission through a further transmission medium.

Optionally, the combining means includes: a plurality of polarization combiners; and one or more directional couplers.

Optionally, each of the plurality of polarization combiners is configured to combine two of the plurality of single-mode light beams into a respective dual-polarization beam.

Optionally, at least one of the one or more directional couplers is configured to combine two of the dual-polarization beams into a dual-polarization single-mode light beam.

Optionally, one of the directional couplers is configured to combine one of the dual-polarization beams and one of the combined dual-polarization single-mode light beam into the combined beam for transmission through the further transmission medium.

Optionally, the combining means includes: a power measuring means configured to measure a power of each of the plurality of single-mode light beams; a mode selection means configured to select a subset of the plurality of single-mode light beams based on the measured power of each of the plurality of single-mode light beams; and a combiner configured to combine the two of the plurality of single-mode light beams into the combined beam for transmission through the further transmission medium.

Optionally, the power measuring means comprises: a plurality of optical taps each connected to a respective transmission medium of the first plurality of transmission media, wherein each of the plurality of optical taps is configured to extract a portion of each of the plurality of single-mode light beams; a power monitor configured to monitor each of the portions of each of the plurality of single-mode light beams; and a control module configured to provide power information to the mode selection means indicating a power of each of the portions.

Optionally, the mode selection means comprises a plurality of optical switches.

Optionally, the mode selection means comprises an optical latching matrix switch.

Optionally, the combiner comprises a polarization combiner.

Optionally, the free space optical receiver comprises an optical receiver chain connected to the further transmission medium and configured to receive the combined beam.

Optionally, the optical receiver chain comprises a preamplifier and a photodetector.

Optionally, the multi-mode transmission medium is a multi-mode optical fiber or a few-mode optical fiber.

Optionally, each of the first plurality of transmission media is a single-mode fiber.

Optionally, the mode separating means is a photonic lantern.

Optionally, the further transmission medium is a single-mode fiber.

According to a second aspect of the present invention, there is provided a method of receiving a light beam comprising a plurality of modes having been propagated through a free space path, the method comprising: receiving the light beam at a multi-mode transmission medium; separating the plurality of modes of the light beam for transmission through a corresponding plurality of single-mode transmission media as a corresponding plurality of single-mode light beams; and combining two or more of the plurality of single-mode beams into a combined beam for transmission through a further transmission medium.

According to a third aspect of the invention, there is provided a vehicle, such as an aircraft, comprising the free space optical receiver according to the first aspect.

Optionally, the vehicle is a drone.

BRIEF DESCRIPTION OF THE DRAWINGS

Embodiments of the invention will now be described, by way of example only, with reference to the accompanying drawings, in which.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a free space optical receiver. In examples described herein, references to "aircraft" include all kinds of aircraft, such as fixed wing, for example military or commercial aircraft, or unmanned aerial vehicles (UAVs), for example drones, and rotary wing aircraft, for example helicopters.

Figure 1:
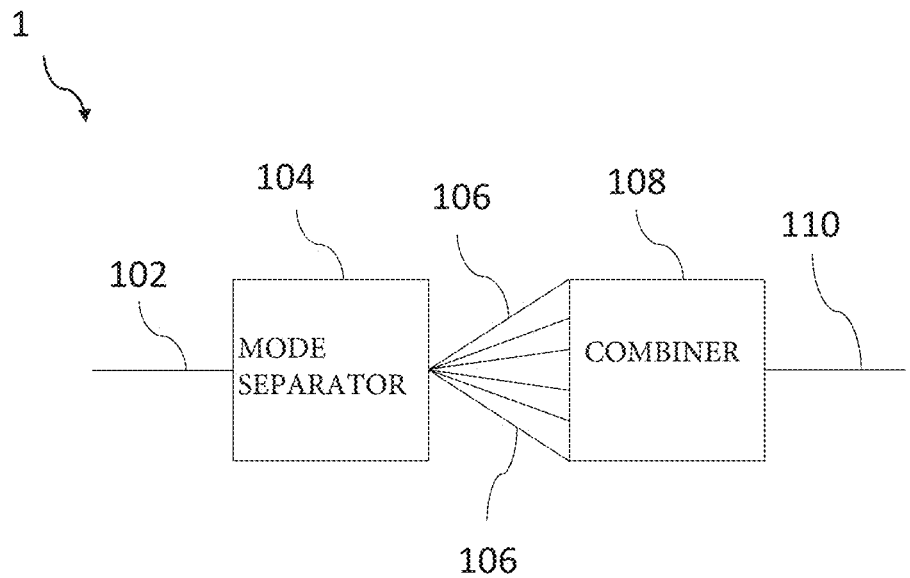
FIG. 1 shows a schematic view of a free space optical receiver, according to an embodiment of the invention.

FIG. 1 shows a schematic view of a free space optical receiver 1, according to an embodiment of the present invention. The free space optical receiver 1 comprises a multi-mode transmission medium 102 configured to receive a light beam comprising a plurality of modes, the light beam having been propagated through a free space path. The free space optical receiver 1 also comprises a mode separating means 104 configured to separate the plurality of modes for transmission through a corresponding first plurality of transmission media 106 as a corresponding plurality of single-mode light beams. Each of the first plurality of transmission media 106 may be a single-mode fiber. The free space optical receiver 1 also comprises a combining means 108 configured to combine two or more of the plurality of single-mode beams into a combined beam for transmission through a further transmission medium 110. The combined beam may be a single-mode beam. The further transmission medium 110 may be a single-mode fiber.

The free space optical receiver 1 is configured to receive a light beam from an optical source, such as a transmitter. The optical source may comprise a laser. The light beam may carry information. For example, the source may encode the information into the light beam. The light beam emitted by the optical source may be a multi-mode or single-mode light beam. The light beam is propagated through a free space path from the source to the free space optical receiver 1. Distortions are typically created in the light beam as it propagates; in particular, the distortions result in a plurality of modes in the light beam. The modes of the light beams may correspond to a cross-sectional intensity distribution pattern of the light beam resulting from diffraction through the air caused by random fluctuations of the air temperature.

The free space optical receiver 1 may comprise an optical receiver chain (not shown) connected to the further transmission medium and configured to receive the combined beam. The optical receiver chain may comprise, for example, a preamplifier and a photodetector. The preamplifier may be used to amplify the combined beam before it reaches the photodetector in order to improve the sensitivity of the photodetector. The preamplifier may be, for example, an erbium-doped fiber preamplifier, semiconductor optical preamplifier or Raman preamplifier. The photodetector may be used to convert the light beam into an electronic signal which represents the information carried by the light beam. The photodetector may comprise, for example, a photodiode, such as a PIN photodiode, an avalanche photodiode or a heterojunction photodiode.

As described, the free space optical receiver 1 described above includes a multi-mode transmission medium 102 configured to receive a light beam transmitted from a transmitter. The multi-mode transmission medium 102 may comprise a multi-mode fiber, such as a few mode fiber having a core diameter of approximately 50 µm. Because the multi-mode transmission medium 102 is able to receive multiple modes, it is able to collect a greater proportion of the transmitted light beam than a single-mode transmission medium such as a single-mode fiber, for example. Coupling light into a multi-mode fiber is simpler than coupling light into a single-mode fiber as the core diameter of multi-mode fibers is larger which enables the propagation of higher order modes. Thus, coupling losses are reduced as compared to existing systems using single-mode fibers. Other advantages arising from the reduction of coupling losses include improvement of the link range at a comparable power, improvement of the link performance for a comparable link range and reduction of the required source power for the transmitter. By separating the received beam into a plurality of single mode beams using the mode separating means 104, and combining the single mode beams into a combined beam using the combining means 108, a combined beam can be provided, for example in the form of a single-mode beam, which can then be provided for further processing. The combined beam may represent the combination of a power of each of the plurality of modes of the light beam after subtracting the losses caused involve during transmission through the free space optical receiver 1. For example, the combined beam may be provided to an optical receiver chain, including a preamplifer and a photodector. Because the on a single set of components (e.g. a single preamplifer and a single photodector) is required to perform this further processing, the high performance of the free space optical receiver 1 discussed above can be provided with relatively few components, mitigating increases in weight, cost and complexity. In some embodiments, the free space optical receiver 1 is used for high data rate optical communications (e.g. above 3 Gbps).

Each of the first plurality of transmission media 106 may be a single-mode fiber. The single mode fiber may have a core diameter of approximately 10 µm.

It is to be noted that although the multi-mode light beam described above comprises six modes, it may comprise a different number of modes.

Figure 2:
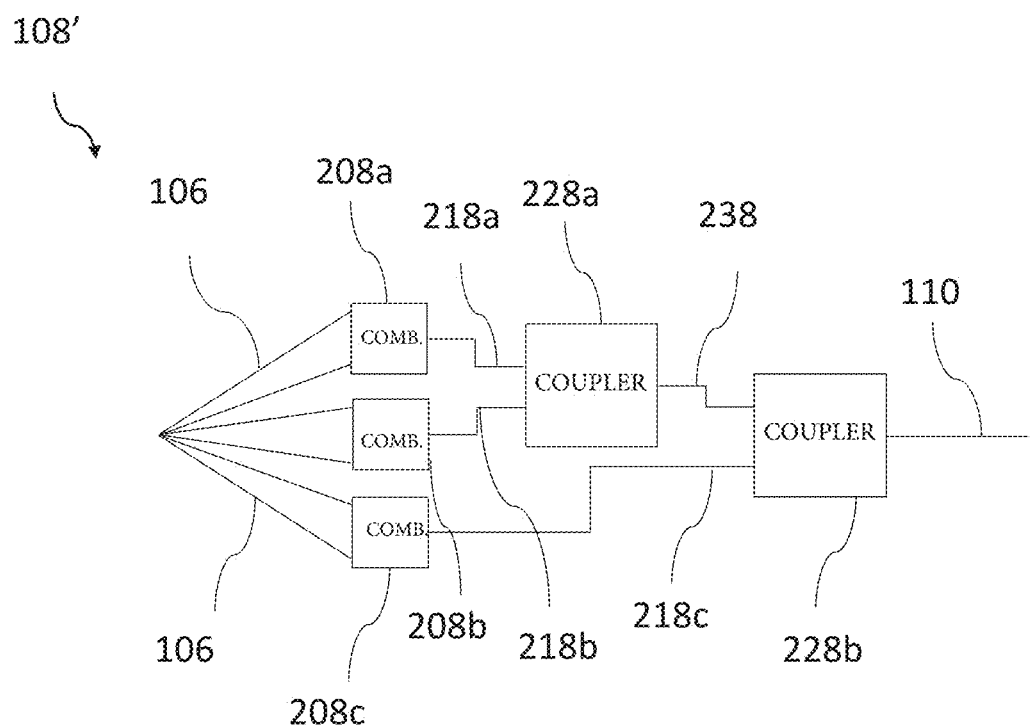
FIG. 2 shows a schematic view of an example of a combining means of the free space optical receiver of FIG. 1.

FIG. 2 shows a schematic view of an example of combining means 108 of the free space optical receiver 1 of FIG. 1. In this example, the combining means 108' of the free space optical receiver 1 includes three polarization combiners 208a, 208b, 208c and two directional couplers 228a, 228b. The directional couplers 228a, 228b may be, for example, hybrid couplers, such as 3 dB couplers. Each of the polarization combiners 228a, 228b is configured to combine two of the plurality of single-mode light beams into a respective dual-polarization beam 218a, 218b, 218c. In this example, there are six single-mode light beams. A first polarization combiner 228a combines two of the six single-mode light beams into a first dual-polarization beam 218*a*, a second polarization combiner 228*b* combines two other beams of the six single-mode light beams into a second dual-polarization beam 218*b*, and a third polarization combiner 228*c* combines the remaining two beams of the six single-mode light beams into a third dual-polarization beam 218*c*.

In this example, a first directional coupler 228*a* is configured to combine the first and second dual-polarization beams 218*a*, 218*b* into a combined dual-polarization single-mode light beam 238.

A second directional coupler 228*b* is configured to combine the third dual-polarization beam 218*c* and the combined dual-polarization single-mode light beam 238 into the combined beam for transmission through the further transmission medium 110.

It is to be noted that, although three polarization combiners 208*a*, 208*b*, 208*c* and two directional couplers 228*a*, 228*b* are represented in FIG. 2, there may be a different number, depending on the separating characteristics of the mode separating means 104 and therefore, on the number of single-mode light beams. In some examples, there may be more than six single-mode light beams. Therefore, more than three polarization combiners and more than two directional couplers may be required. For example, if the mode separating means 104 provides eight single-mode light beams, four polarization combiners and three directional couplers could be used. Similarly, there may be less than six single-mode light beams. For example, if the mode separating means 104 provides four single-mode light beams, two polarization combiners and one directional couplers could be used.

As explained above, a polarization combiner combines the polarization of two single-mode light beams each having one polarization. In general, the losses arising from the combination of two single-mode light beams using a polarization combiner are approximately 0.5 dB, whereas the losses from use of a directional coupler may be typically higher, for example 3 dB. In this example the directional couplers are 3 dB directional couplers. A 3 dB loss in beam power arises from the use of a 3 dB directional couplers. Accordingly, use of polarization combiners in the present example reduces losses in the beam combination process.

In some examples, if the mode separating means 104 presents two single-mode light beams, one polarization combiner could be used, without using directional couplers. The polarization combiner would combine the two single-mode light beams into a dual-polarization light beam for transmission through the further transmission medium 110. If the mode separating means 104 provides more than two single-mode light beams, the use of both polarization combiners and directional couplers is advantageous, for the following reasons. Typically, each of the single-mode light beams provided by the mode separating means 104 have a polarization. The polarization of each of the single-mode light beams provided by the mode separating means 104 may be the same. Each polarization combiner combines single-mode light beams into a dual-polarization single-mode light beam having two polarizations. However, a polarization combiner can typically only combine two polarizations. Further a combination of a dual-polarization single-mode beam with another beam with a polarization combiner would result in losses of photons carried by two of the beams being combined. Therefore, use of a directional coupler to combine a dual-polarization single-mode beam with another beam avoids losses.

In some examples, only directional couplers may be used. For example, directional couplers may be used in place of the polarization combiners 208*a*, 208*b*, 208*c* described above.

In this example, the polarization combiners 208*a*, 208*b*, 208*c* are placed before the directional couplers 228*a*, 228*b* along an optical path. In other examples, the directional couplers 228*a*, 228*b* may be placed before the polarization combiners 208*a*, 208*b*, 208*c*. As explained above, directional couplers typically cause greater losses than polarization combiners. In this example, the mode separating means 104 provides six single-mode light beams. By placing the polarization combiners before the directional couplers along the optical path, three polarization combiners and two couplers are required. In contrast, by placing the directional couplers before the polarization combiners along the optical path, three directional couplers are required. As explained above, because each directional coupler typically causes greater losses, it is preferred to use as few directional couplers as possible to inhibit losses. Thus, the configuration of the combining means 108' showed in FIG. 2 mitigates losses.

The combining means 108' described above uses relatively few components to combine several single-mode transmission media 106 into one single-mode transmission medium A free space optical receiver 1 using a combining means according to this example can therefore be kept relatively light, small and/or inexpensive.

In some examples, the combining means 108 is configured to select two or more of the single-mode light beams transmitted on the single mode transmission media 106. Two such examples are described below with reference to FIGS. 3*a* and 3*b*.

Figure 3A:
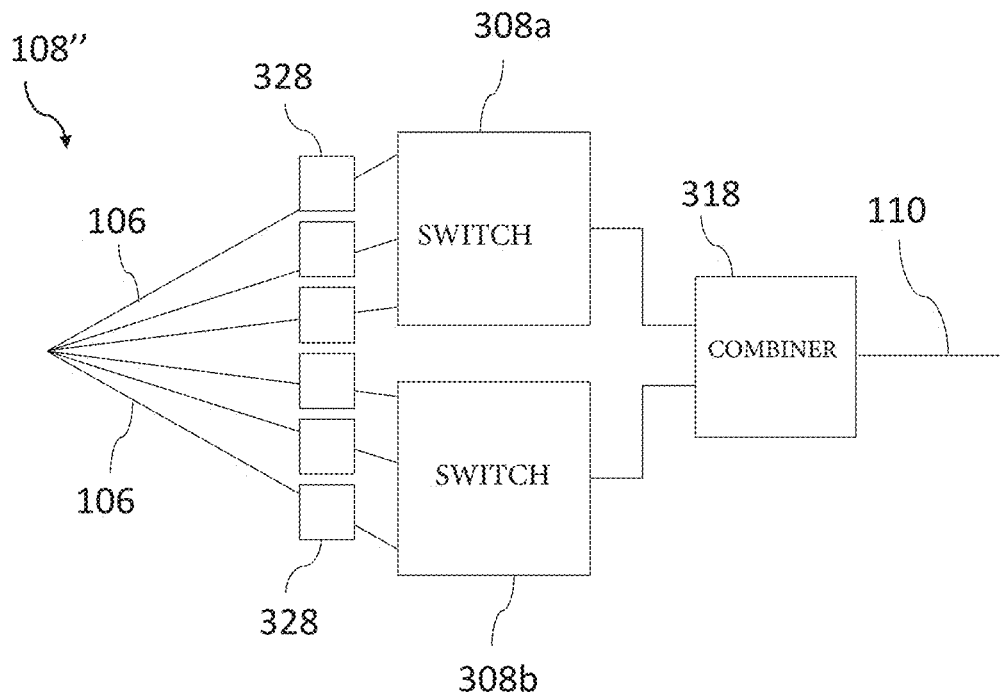
FIG. 3a shows a schematic view of further example of a combining means of the free space optical receiver of FIG. 1.

FIG. 3*a* shows a combining means 108" which includes multiple optical power measuring means 328 each configured to measure an optical power of a corresponding one of the plurality of single-mode light beams received through the first plurality of transmission media 106. In this example, there are six single-mode light beams. Thus, the combining means 108" includes six power measuring means 328. In this example, each of the six power measuring means 328 comprises an optical tap each connected to a respective transmission medium of the first plurality of transmission media 106. Each of the six optical taps is configured to extract a portion of each of the six single-mode light beams. Each optical tap may extract 1% of each single-mode beams, for example. The power measuring means 328 also comprises a power monitor configured to generate a voltage that is proportional to the corresponding extracted power. The voltage is transmitted to a control module configured to transmit a signal to a mode selection means indicative of the power of the corresponding single-mode light beam based on the voltage. For example, the control module may be a processor or a central processing unit. The transmitted signal may represent the power of the portions of each of the plurality of single-mode light beams. The signal may be transmitted by wired or wireless communication, for example.

The combining means 108" also includes a mode selection means configured to select a subset of the plurality of single-mode light beams based on the measured power of each of the six single-mode light beams. In this example, the mode selection means comprises two optical switches 308*a*, 308*b*. Each optical switch 308*a*, 308*b* may be configured to receive three of the six single-mode light beams. Each optical switch 308*a*, 308*b* may be configured to transmit one of the six single-mode light beams, based on the signal transmitted by the control module. For example, as mentioned above the control module may transmit a signal representing the power of the portions of each of the six of single-mode light beams. Each of the two optical switches 308a, 308b may comprise a processor which can determine a characteristic of the single-mode light beams. For example, the processor may receive the signal and determine which of the three beams has the highest power. Based on the signal, a first optical switch 308a may be configured to transmit the single-mode light beam having the highest power among three of the plurality of single-mode light beams. Similarly, based the signal, a second optical switch 308b may be configured to transmit the single-mode light beams having the highest power among the other three beams of the six single-mode light beams.

The combining means 108″ also includes a combiner 318 configured to combine the two selected single-mode light beams into the combined beam for transmission through the further transmission medium 110. In this example, the combiner 318 comprises a polarization combiner.

Figure 3B:
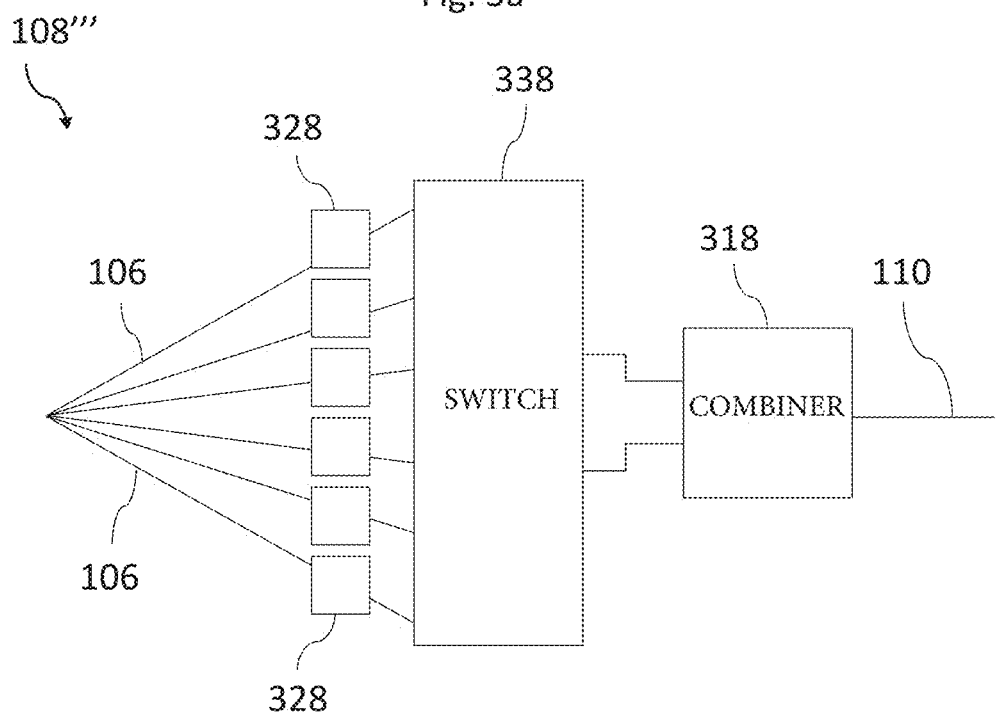
FIG. 3b shows a schematic view of a still further example of combining means of the free space optical receiver of FIG. 1.

FIG. 3b shows another example of a combining means 108 of the free space optical receiver 1 of FIG. 1.

In this example, the combining means 108‴ again includes the six power measuring means 328, the mode selection means and the combiner 318 described with reference to FIG. 3a.

Moreover, in this example, each of the power measuring means 328 again comprises an optical tap and a power monitor and is connected to the control module, as described above with reference to FIG. 3a.

In this example, the mode selection means comprises an optical switch 338. The optical switch 338 may be an optical latching matrix such as a 6×6 optical latching matrix switch. In other examples, the optical latching matrix switch 338 may be an 8×8 or 4×4 latching matrix switch, for example, depending on the number of single-mode light beams. It is to be noted that although the multi-mode light beam described above comprises six modes, it may comprise a different number of modes. In other example, the multi-mode light beam may comprise eight modes. Thus, optical the optical switch 338 may be an 8×8 optical latching matrix switch which may select two single-mode light beams out of the eight single-mode beams. In this example, there are six single-mode light beams. The optical switch 338 may determine a characteristic of each single-mode light beam, such as a power. The optical switch 338 may be configured to transmit two of the six single-mode light beams, based on the signal transmitted by the control module. For example, the optical switch 338 may be configured to transmit the two of the six single-mode light beams presenting the highest power. The optical switch 338 may be implemented by combination of software and hardware, for example.

In the examples described with reference to FIG. 3a and FIG. 3b, single-mode light beams having a high power are selected from the single-mode light beams, and a combiner is used to combine the two selected single-mode light beams. Typically, a high proportion of power the received power is carried by one of the modes. In each of the examples of FIGS. 3a and 3b, the highest power mode is selected. As described above, the selected beams may be combined by a combiner such as a polarization combiner which involves relatively small losses compared to, for example, a directional coupler. Further, as is also explained above, the power measurement of the different modes can be performed with only a small loss. Accordingly, the combining means 108″, 108‴ according to these examples enable the collection of a high proportion of the transmitted light beam compared to systems using components such as directional couplers, which typically involve higher losses.

The example of FIG. 3a provides a relatively simple arrangement for selecting two high-power modes, including the highest-power mode. In the example described with reference to FIG. 3b, the use of optical latching matrix switch enables the selection of the two modes of the plurality of single-mode light beams having the highest power, further increasing the proportion of the transmitted light beam which is collected.

Figure 4:
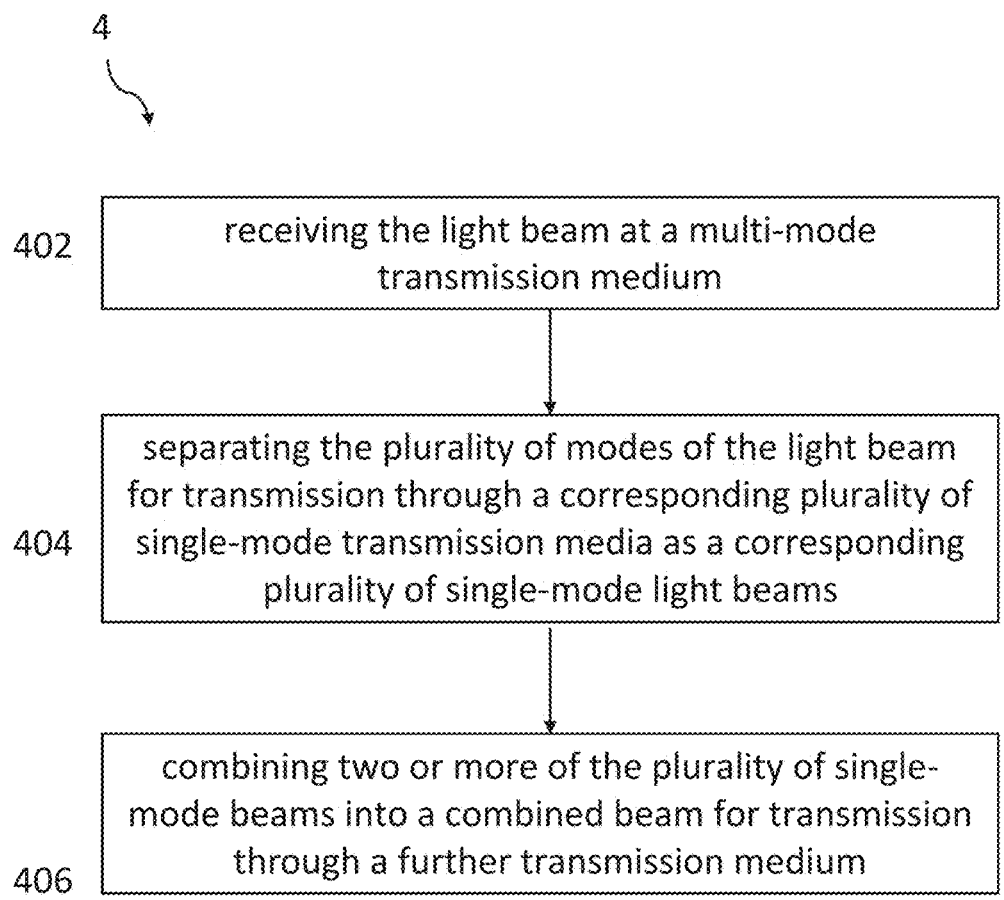
FIG. 4 shows a process flow chart of a method, according to an embodiment of the invention.

FIG. 4 shows a process flow chart of a method, according to an embodiment of the present invention. The method of FIG. 4 may be carried out by a free space optical receiver, such as the free space optical receiver 1 described above with reference to FIG. 1.

At block 402, a multi-mode transmission medium receives a light beam having been propagated through a free space path. For example, the multi-mode transmission medium may be the multi-mode transmission medium 102 according to any of the examples described above with reference to FIG. 1.

At block 404, a mode separating means separates the plurality of modes of the light beam for transmission through a corresponding plurality of single-mode transmission media as a corresponding plurality of single-mode light beams. For example, the mode separating means may be the mode separating means 104 according to any of the examples described above with reference to FIG. 1. The plurality of single-mode transmission media may be the plurality of single-mode transmission media 106 according to any of the examples described above with reference to FIGS. 1 to 3b.

At block 406, a combining means combines two or more of the plurality of single-mode beams into a combined beam for transmission through a further transmission medium. For example, the combining means may be the combining means 108, 108′, 108″, 108‴ according to any of the examples described above with reference to FIGS. 1 to 3b. The further transmission medium may be the further transmission medium 110 according to any of the examples described above with reference to FIGS. 1 to 3b.

In some examples, a vehicle may be provided with the free space optical receiver 1 as per any of the examples described above with reference to FIG. 1. For example, the free space optical receiver 1 may be mounted to an exterior of the vehicle. In some examples, the vehicle may be an aircraft, such as an airplane or a drone or a high-altitude aircraft. The vehicle may alternatively or additionally be a spacecraft, such as a satellite.

Figure 5:
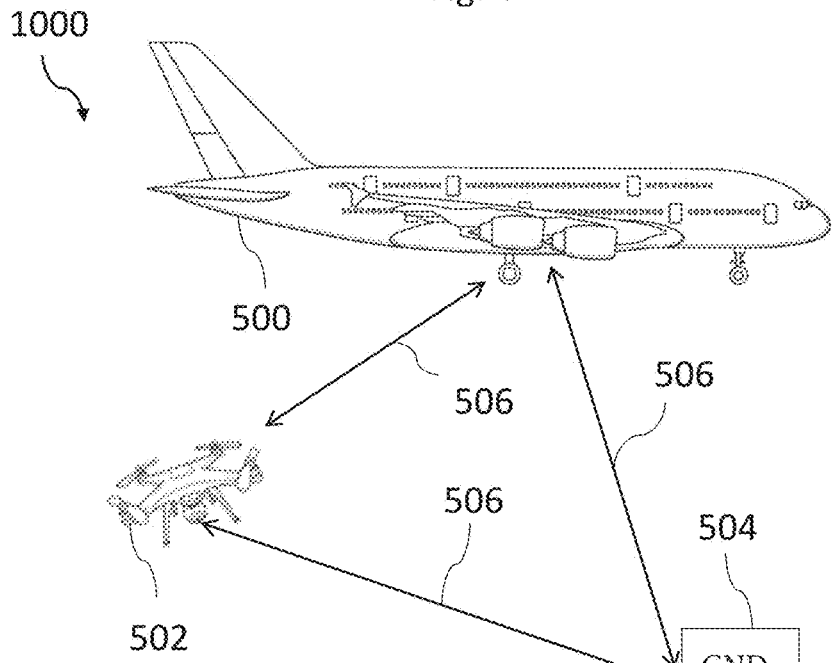
FIG. 5 shows an illustrative view of a system, according to an embodiment of the invention.

FIG. 5 shows an illustrative view of a system, in which embodiments of the present invention may be implemented.

In this system, there is shown examples of vehicles, in the form of aircraft, including an airplane 500 and a drone 502. The aircraft 500, 502 may comprise a free space optical receiver 1 according to any of the examples described herein. For example, the aircraft 500 and 502 communicate via free space optical communications and each aircraft 500, 502 also communicate with a ground unit 504. The ground unit 504 may be, for example, a control tower. The ground unit 504 may also comprise the free space optical receiver 1.

Each aircraft and the ground unit may comprise an optical source, such as a laser, emitting a light beam which is propagated through a free space path 506. The light beams contain information, such as flight data, weather data or location data. The light beam is received at the free space optical receiver 1 of the aircraft 502, 500 or at the free space optical receiver 1 of the ground unit 504.

Providing a vehicle/aircraft/spacecraft with the free space optical receiver 1 may allow the vehicle/aircraft/spacecraft to communicate securely with other vehicles/aircraft/spacecraft and/or ground based units. The reduced space and/or weight provided by examples of the free space optical receiver 1 described herein may be of particular importance in aircraft and spacecraft, particularly in light weight and/or small aircraft/spacecraft such as drones and/or satellites, where space weight and power budgets are limited. Moreover, the reduced losses provided by examples of the free space optical receiver 1 described herein may be of particular importance in aircraft and spacecraft because it could improve the link range at a comparable power, improve the link performance for a comparable link range and reduce the required source power.

While some embodiments of the present invention have been described in the context of use within an aircraft, it should be appreciated that the invention has utility in other applications, including in vehicles other than aircraft, such as spacecraft, automobiles, railway vehicles, and watercraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A free space optical receiver comprising:
    a multi-mode transmission medium configured to receive a light beam comprising a plurality of modes, the light beam having been propagated through a free space path;
    a mode separating means configured to separate the plurality of modes for transmission through a corresponding first plurality of transmission media as a corresponding plurality of single-mode light beams; and
    a combining means configured to combine two or more of the plurality of single-mode beams into a combined beam for transmission through a further transmission medium.

2. The free space optical receiver according to claim 1, wherein the combining means includes:
    a plurality of polarization combiners; and
    one or more directional couplers.

3. The free space optical receiver according to claim 2, wherein each of the plurality of polarization combiners is configured to combine two of the plurality of single-mode light beams into a respective dual-polarization beam.

4. The free space optical receiver according to claim 3, wherein at least one of the one or more directional couplers is configured to combine two of the dual-polarization beams into a dual-polarization single-mode light beam.

5. The free space optical receiver according to claim 4, wherein one of the directional couplers is configured to combine one of the dual-polarization beams and one of the combined dual-polarization single-mode light beam into the combined beam for transmission through the further transmission medium.

6. The free space optical receiver according to claim 1, wherein the combining means includes:
    a power measuring means configured to measure a power of each of the plurality of single-mode light beams;
    a mode selection means configured to select a subset of the plurality of single-mode light beams based on the measured power of each of the plurality of single-mode light beams; and
    a combiner configured to combine the two of the plurality of single-mode light beams into the combined beam for transmission through the further transmission medium.

7. The free space optical receiver according to claim 6, wherein the power measuring means comprises:
    a plurality of optical taps each connected to a respective transmission medium of the first plurality of transmission media, wherein each of the plurality of optical taps is configured to extract a portion of each of the plurality of single-mode light beams;
    a power monitor configured to monitor each of the portions of each of the plurality of single-mode light beams; and
    a control module configured to provide power information to the mode selection means indicating a power of each of the portions.

8. The free space optical receiver according to claim 7, wherein the mode selection means comprises a plurality of optical switches.

9. The free space optical receiver according to claim 7, wherein the mode selection means comprises an optical latching matrix switch.

10. The free space optical receiver according to claim 6, wherein the combiner comprises a polarization combiner.

11. The free space optical receiver according to claim 1, comprising an optical receiver chain connected to the further transmission medium and configured to receive the combined beam.

12. The free space optical receiver according to claim 11, wherein the optical receiver chain comprises a preamplifier and a photodetector.

13. The free space optical receiver according to claim 1, wherein the multi-mode transmission medium is a multi-mode optical fiber or a few-mode optical fiber.

14. The free space optical receiver according to claim 1, wherein each of the first plurality of transmission media is a single-mode fiber.

15. The free space optical receiver according to claim 1, wherein the mode separating means is a photonic lantern.

16. The free space optical receiver according to claim 1, wherein the further transmission medium is a single-mode fiber.

17. A method of receiving a light beam comprising a plurality of modes having been propagated through a free space path, the method comprising:
    receiving the light beam at a multi-mode transmission medium;

separating the plurality of modes of the light beam for transmission through a corresponding plurality of single-mode transmission media as a corresponding plurality of single-mode light beams; and combining two or more of the plurality of single-mode beams into a combined beam for transmission through a further transmission medium.

18. An aircraft, comprising the free space optical receiver of claim 1.

19. A vehicle according to claim 18 wherein the vehicle is a drone.

* * * * *